Feb. 28, 1939.  G. C. MORGAN  2,149,145
INDICATING ADJUSTMENT FOR SEED BOARDS OF LINTER GIN BREASTS
Filed Dec. 13, 1937  4 Sheets-Sheet 3
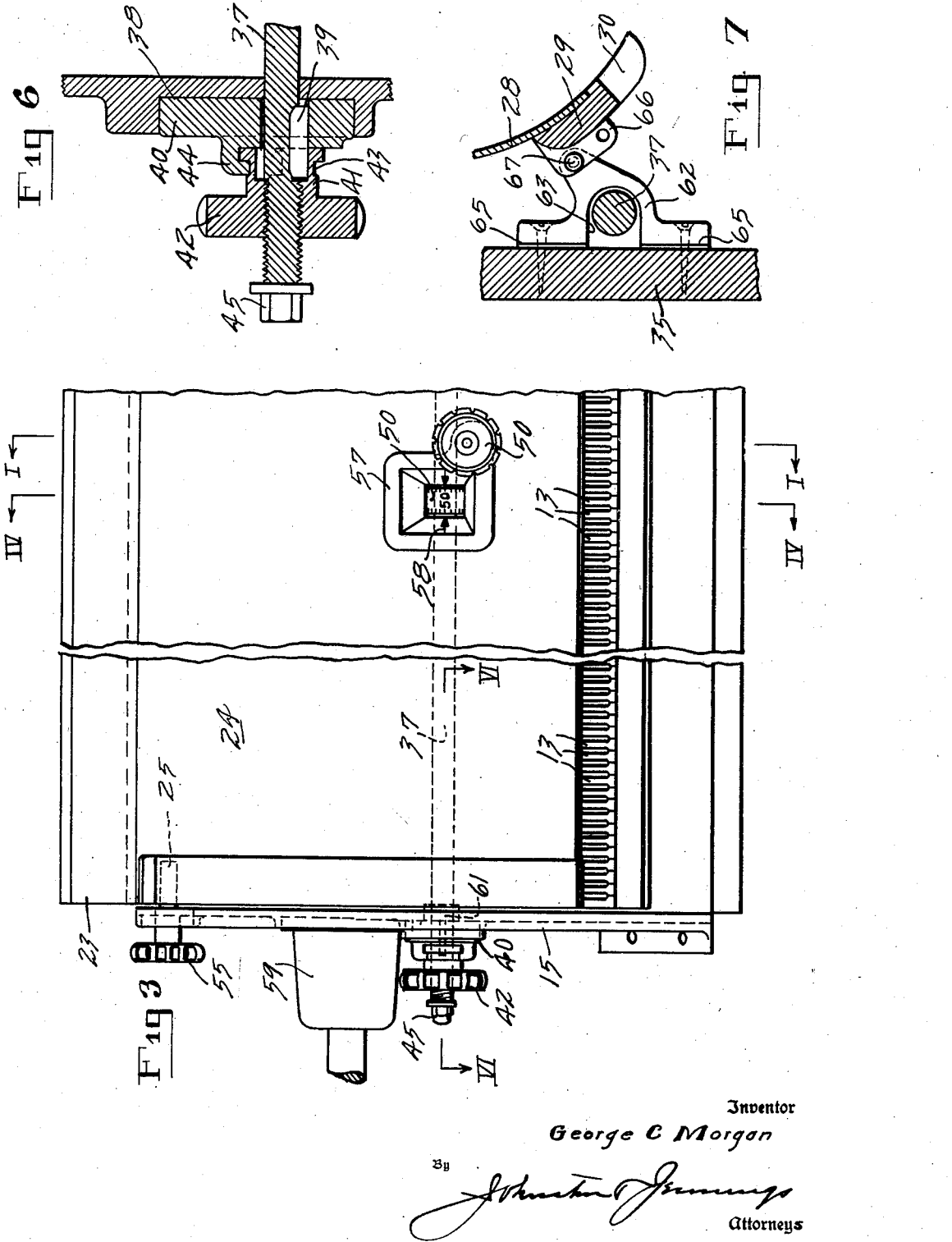
Inventor
George C Morgan
By
Johnston Jennings
Attorneys

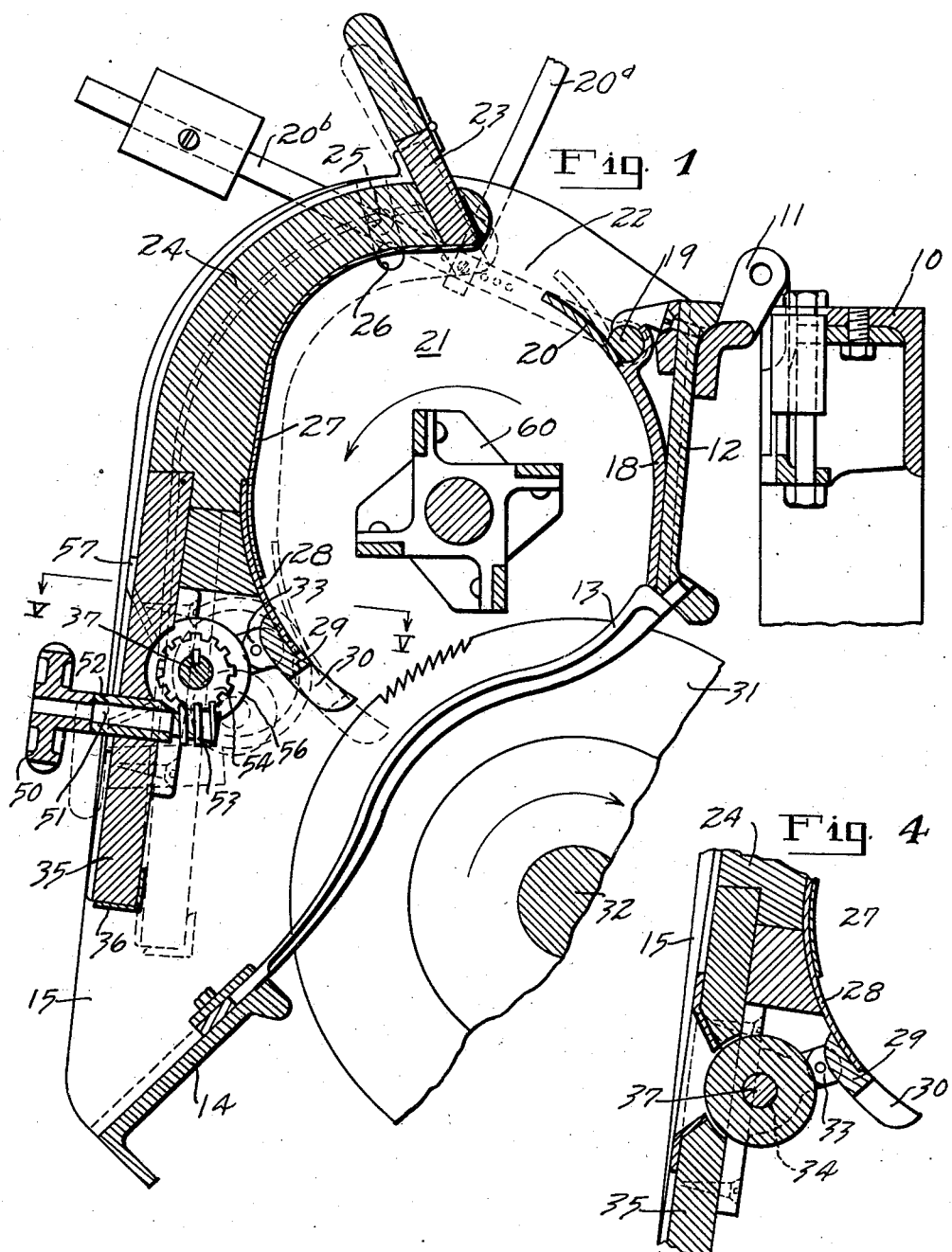

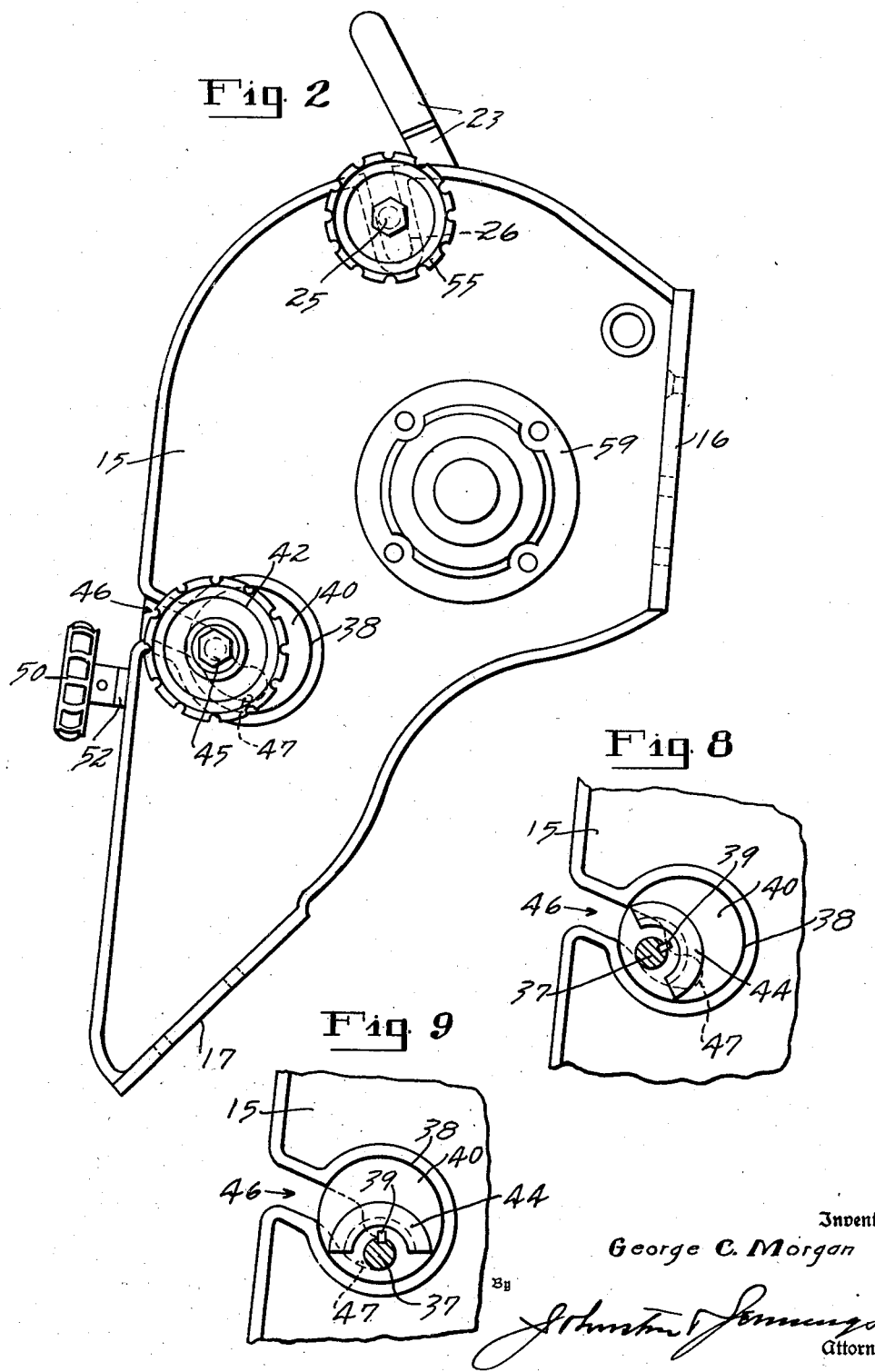

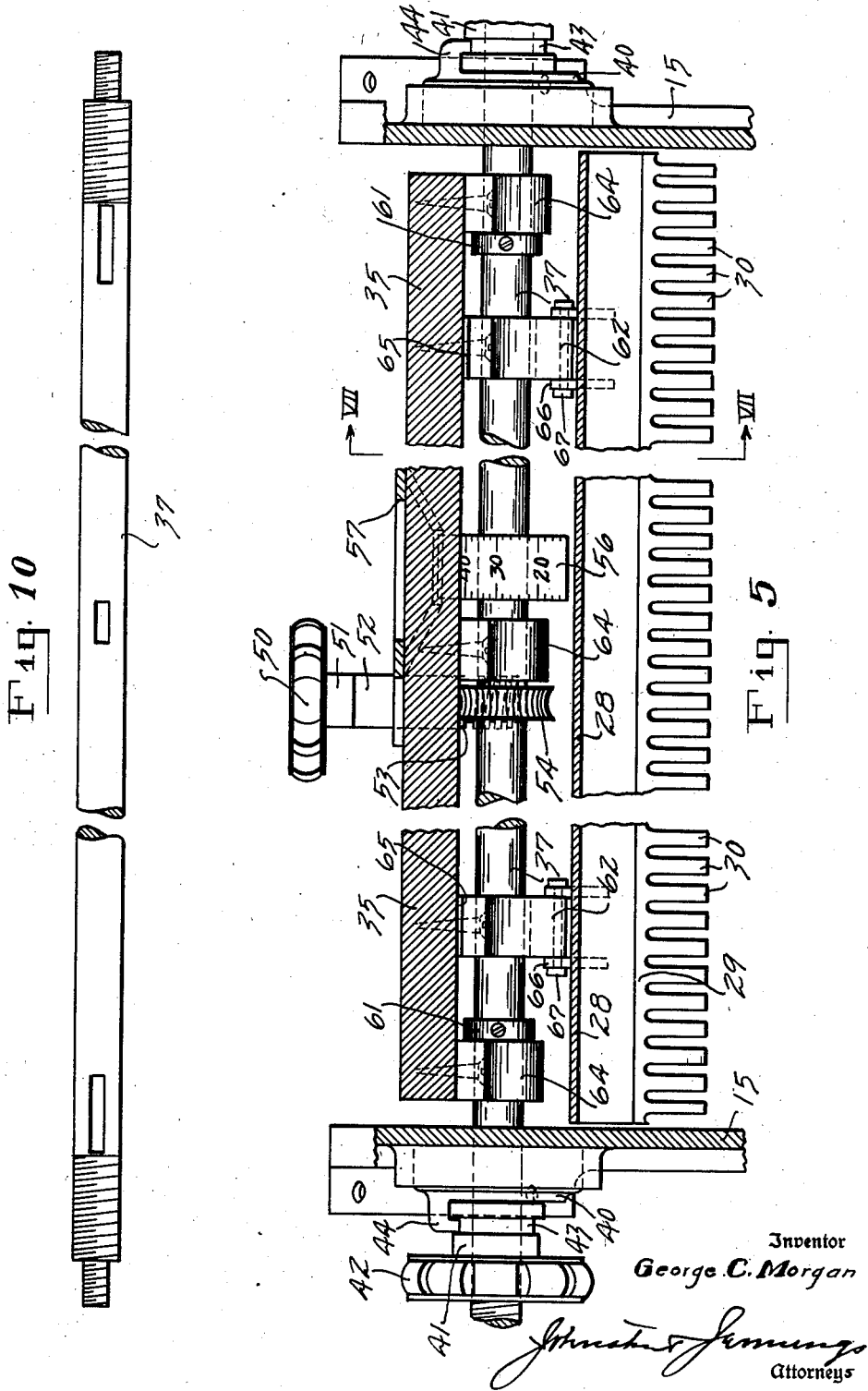

Patented Feb. 28, 1939

2,149,145

UNITED STATES PATENT OFFICE 2,149,145

INDICATING ADJUSTMENT FOR SEED BOARDS OF LINTER GIN BREASTS

George C. Morgan, Birmingham, Ala., assignor to Continental Gin Company, a corporation of Delaware Application December 13, 1937, Serial No. 179,428

19 Claims. (Cl. 19—61)

My invention relates to linter gins, and is more particularly concerned with devising a novel means by which the seed board of the gin breast can be adjusted, both to vary materially the size of the roll box and to control the delinting action, responsive to a control mechanism by which the setting of the seed board is indicated externally of the gin so that the seed board of a linter gin or the seed boards of a battery of such gins can be quickly and accurately set to any desired adjustment that will be best suited for the treatment of the seed stock to be delinted.

Linter gins, as is well understood, comprise a hinged breast in which is mounted a grate fall, through the ribs of which the delinting saws of the gin pass and traverse the under portion of a roll box in the breast in which a roll of seed to be delinted rotates responsive to a float and from which the delinted seed escape between the saws and a comb or grid at the base of a curved seed board which forms the adjustable front of the roll box.

Customarily, the seed board is demountably pivoted at its upper end to the breast sides and is associated with suitable means by which its lower end may be swung with an arcuate movement about its pivotal center to vary the spacing between its seed comb and the saws, thereby to govern the rate of discharge of the seed, the length of time that the seed will be held in the roll box, and the amount of lint that will be removed from them by the action of the saws during the time required for them to traverse the roll box. It is also customary to provide the roll box with an adjustable feed control curve movable responsive to the density and size of the roll and adapted to control the rate of feed of cotton seed to the roll box.

The novel features which my present invention proposes to introduce into a linter gin of the above general character may be thus summarized:—

I propose to mount the seed board so that it will have pivotal movement about an axis adjustably mounted in the breast near the level of its comb while the upper end of the seed board is so guided that its adjustments will not only increase the clearance between its comb and the grate fall, but will have the important effect of definitely and materially enlarging the upper portion of the seed box by expanding it both laterally and vertically. As the roll box is thus enlarged, the seed roll therein tends to expand and become softer, whereupon the feed control curve will respond to increase the rate of feed of seed automatically, and as the seed outlet will have been increased by the movement of its comb away from the saws, I obtain a more rapid discharge of the seed. From these several coordinated controls a regulation of the volumetric flow of the seed through the roll box and of the delinting action thereon will result that is best suited for the seed stock under treatment.

I have devised a simple and effective means for controlling both the arcuate shifting of the seed board axis and the angular movement of the seed board about such axis, which comprises shiftable elements which, when engaged will set and lock the seed board in the desired adjusted position in the gin breast and which when disengaged will automatically free the seed board to be detached from the breast. An important feature of these elements is that when they are reengaged they insure the return of the seed board to its former adjustment without requiring any setting thereof. This is important in that it enables a predetermined operating position for the seed board to be selected and insures that the board will resume the said predetermined adjustment regardless of how often it may be necessary to dismount it from the gin breast.

I have associated with the mechanism by which the seed board is adjusted an externally visible indicator means by which the setting of the seed board can be accurately determined and these indicators being visible form a ready means by which all of the linter gins in a battery can be maintained with correspondingly adjusted seed boards, which affords a practical operating facility of material advantage in this particular art.

My invention further comprises the novel details of construction and arrangements of parts which are hereinafter more particularly described by reference to the accompanying drawings which illustrate the same only in their preferred embodiment.

In the drawings:—

Fig. 1 is a vertical transverse cross-sectional view through the front of a linter gin taken on the line I—I of Fig. 3 and showing in full lines the seed board adjusted to its full open position, and in dotted lines the position assumed by the seed board in its closed or innermost position, parts of the linter gin non-essential to an understanding of my invention being omitted.

Fig. 2 is a detail end view of the breast of the gin detached.

Fig. 3 is a fragmental view broken away showing in front elevation the linter gin breast as same is shown in full lines in Fig. 1.

Fig. 4 is a detail cross-sectional view through the seed board adjusting mechanism and its indicator, taken on the line IV—IV of Fig. 3.

Fig. 5 is a fragmental cross-sectional view taken on the line V—V of Fig. 1 showing in plan the worm drive and indicator dial on the adjustable pivot shaft for the seed board, with a modified form of bracket for mounting the seed board and shaft.

Fig. 6 is a detail cross-sectional view through the adjustable mounting cams for the seed board, which is taken on the line VI—VI of Fig. 3.

Fig. 7 is a sectional view on the line VII—VII of Fig. 5.

Figs. 8 and 9 are external end views showing the adjusting cams supporting the seed board shaft in different operating positions in the breast end frames, the clamp nuts for the cams being detached and the shafts shown in cross-section.

Fig. 10 is a detail view of the shaft.

Similar reference numerals refer to similar parts throughout the drawings.

Since my invention is confined to the breast structure of the linter gin I have omitted all unnecessary parts of the gin which are not pertinent to a description of this invention. The gin frame proper is generally indicated at 10 and it has pivotally mounted thereto a bracket 11 made fast to the upper rail 12 of the gin breast, which rail at its lower end receives the ribs 13 forming the grate fall, which ribs at their lower ends, are made fast to a lower rail 14. These rails 12 and 14 are made fast at their ends in any suitable manner to the side frames 15 of the breast proper, which side frames are shown in detail in Fig. 2. The upper rail 12 is bolted or otherwise made fast to a mounting flange 16 on each frame and the lower rail is similarly attached to a mounting flange 17 at the base of each end frame.

A roll box is defined between the frames by the provision of a back curved plate 18 fixedly mounted in front of the rail 12 and abutting the upper ends of the ribs 13 below, while its upper end forms a bearing seat for the shaft 19 which supports the feed control curve 20 of the roll box which is suitably connected by an operating rod 20a to the linter feed mechanism, not shown, so that as the curve swings inwardly responsive to a counter-weighted arm 20b the feed will be increased and as it is displaced outwardly the rate of feed will be slowed up. All this mechanism is standard in linter gins and therefore needs no particular description here.

The seed is admitted to the roll box 21 through a feed opening 22 lying between the feed control curve 20 and the hinged sectional chute 23 mounted at the inner upper end of the curved seed board 24 which is received adjustably between the end frames 15 and has at each end upper guide pins 25 which work in guide slots 26 provided in the end frames and disposed with an upward and outward incline toward the front of the gin and which are left open at the top so that these pins can be disengaged therefrom when the seed board is to be lifted out of the breast. The guides 26 thus control the position of the top of the seed board, and as it is raised they cause it to move outwardly in a direction to enlarge the roll box both vertically and laterally, as is more clearly indicated in Fig. 1, where the dotted lines show the innermost position of the curved seed board 24 while the full lines show it in maximum open position.

The seed board as shown is made up of wooden boards faced on the inside with a metallic lining 27, which at its lower end overlaps an adjustable curved plate 28 that is in turn made fast to the comb body 29 having the comb teeth 30. This comb can be of any standard construction and the teeth thereof are spaced and adapted to be received between the saws 31 of the gin, which are rotated in the direction of the arrow, Fig. 1, by means of the saw shaft 32, deriving its motion from the drive of the gin, which being of standard construction needs no detail description.

The comb body 29, as seen in Figs. 1 and 4, is mounted at suitable intervals lengthwise across the gin breast by bracket arms 33 hinged to bearing brackets 34 which are attached to an apron 35 depending from the lower portion of the seed board, and which is reinforced and braced at its lower end by a corner angle 36.

I journal the adjustment control shaft for the seed board in the bearing brackets 34. The ends of the shaft 37, as will appear from Figs. 6 and 7, project eccentrically through slots in the washer seats 38 defined by the external arcuate flanges or shoulders on the end frames. The shaft has aligned axially disposed keys 39 fast thereon opposite the washer seats 38 and duplicate circular washers 40 are adapted to be slipped endwise onto the shaft ends and into engagement with said keys 39 and to be seated with a snug fit rotatable within said flanged washer seats 38. The shaft ends beyond the keys 39 are threaded to receive clamp nuts 41 which are recessed at their inner ends that abut their respective washers so that they will overhang and be rotatable over the adjacent key 39. At its outer end each clamp nut carries a hand wheel 42 and near its inner end it is externally grooved at 43 to receive and rotatably interlock with the inner arcuate edge of an undercut flange 44 that projects normally from the outer face of its respective washer 40. Each clamp nut 41 is thus so engaged with its respective washer that it is free to be screwed on shaft 37 toward and from the adjacent washer seat 38, and as it is thus adjusted it will carry with it its respective washer so as to move it into or out of its seat 38 without disengaging it from its respective key 39. When the washers are run into their seats they are adapted to be clamped in position therein by their respective clamp nuts 41 and when so interlocked it will be obvious that the washers, which are mounted eccentrically on shaft 37, will always have corresponding position because of their engagement with the aligned keys 39 on said shaft. A nut 45 is screwed on each reduced threaded end of the shaft 37 in position to stop the outward adjustment of the adjacent hand wheel 42 as soon as the washer controlled by it has been moved outwardly to clear its seat 38 but before it has moved far enough to become disengaged from its respective key 39. Thus the movements of the washers into and out of their respective seats 38 is accomplished without disturbing their angular relation to the shaft 37.

By reference to Figs. 2, 8 and 9, it will be seen that the shaft ends pass correspondingly shaped slots formed in each end frame 15, each slot comprising an open end 46 which extends outwardly through the front edge of its respective frame 15, and an inner arcuate end 47 disposed in their respective washer seats and arranged close to and concentric with, the marginal flange or wall defining said seats. When the washers are run out to clear the seats the shaft can be readily mounted in operating position in the end frames by passing the ends of the shaft through the open ends 46 of the slots and on down into the arcuate positions 47 of the slots. By running in the clamp nuts both washers, while still held in corresponding angular position on the shaft by their keys 39, can be moved into position in the washer seats and clamped therein so as to hold the shaft in adjusted position.

It will be noted, however, that the curvature of the slot ends 47 will permit the shaft, when rotated clockwise (Fig. 8) to force the rotation of its washers 40 in their seats, to follow the curvature of the slots 47 until it moves up into alignment with the open ends 46 of the slots. This arcuate adjustment bodily of the shaft about the center of the washer seats will appear by comparing its position in Figs. 9, 8 and 2, Fig. 9 showing the shaft at the innermost end of the slots 47, Fig. 8 showing the shaft in an intermediate position in the slots, and Fig. 2 showing the shaft opposite the outlet ends 46 of the slots. This movement of the shaft effected by reason of its eccentric mounting on its washers 40, forces the adjusting movements that control the operating position of the seed board because the shaft remains at all times journalled in its fixed bearings 34 on the seed board, and the latter therefore has imparted to it the desired adjustments relative to the breast. When the shaft occupies the position in Fig. 9 the seed board will have its position shown in dotted lines in Fig. 1, and when the shaft occupies the position shown in Fig. 2 the seed board will be shifted to its full line position shown in Fig. 1, and in moving from one to the other of these positions the comb 30 has almost a radial movement with reference to the saws while the seed board has a movement which enlarges the roll box materially both in a lateral and in an upward direction.

In Figs. 1 and 5 I show the means for rotating the shaft 37 and its washers 40 to effect and control the adjustment of the seed board. Such means comprises a hand wheel 50 operating a shaft 51 journalled in a bearing sleeve 52 mounted fast in the center of the seed board member 35, and on the inner end of shaft 51 I form or mount a worm 53 which meshes with a worm wheel 54 keyed on shaft 37. Through this worm drive, shaft 37 can be rotated about its long axis, turning its washers 40 in their seats 38 and forcing the shaft to move bodily outwardly and upwardly following the curve of the slot portions 47. As this movement of the shaft is imparted through the bearings 34 to the seed board, and it moves upwardly and outwardly with relation to the saws, it will pivot about shaft 37 while its pins 25 adjust themselves freely in the top slots 26. When the desired adjustment has been reached hand wheels 55, screwed on the outer threaded ends of the guide pins 25, are run in against the frames 15 and lock the upper ends of the seed board in adjusted position, and the clamp nuts 41 are run in by their hand wheels 42 until they make the washers 40 fast on their seats 38.

To indicate the adjustment in which the seed board has been set by the angular movement imparted to its control shaft 37, I provide an indicator dial 56, Fig. 5, mounted fast on said shaft 37 and disposed opposite a sight opening frame 57 set into the front of the seed board in position to permit the dial to be read by the gin operator. Hand pointers 58 are provided on the sight frame which in relation to the scale or markings on the dial 56 will indicate the angular setting of shaft 37. As shown in Fig. 3, the indicator shows the shaft set on the position "50".

Suitable bearings 59 are provided for the float 60 in the roll box 21. The shaft 37 is held by any suitable means, such as collars 61 (Fig. 5), against longitudinal displacement in its bearings in which it has only rotary movement.

In Figs. 5 and 7 I show a modification of the mounting brackets for the comb which as here shown are designated 62 and have slots 63 which straddle and stand clear of shaft 37. The shaft is journalled in separate bearings 64. Liners or shims 65 may be used to obtain an adjustment of the comb relative to the seed board without disturbing the shaft bearings 64.

In operation, assuming the seed board adjusted to its most open or expanded position, which is that shown in Fig. 1, the seed comb 30 will be withdrawn from between the saws 31, the roll box 21 will be enlarged, the resulting expansion of the seed roll in the chamber will permit the feed control concave 20, that is held pressed against the roll, to move inwardly to its full line position, and the rate of feed of seed to the roll box will be increased while the rate of discharge of seed therefrom will be at a maximum and the time of treatment of the seed will be at a minimum. As it is desired to decrease the rate of feed and to increase the time allowed for the saws to delint same, the wheel 50 is grasped and the worm gearing it controls is turned to cause the shaft 37 to rotate in a counter-clockwise direction, as viewed in Fig. 1. This movement of the shaft being also imparted to its washers 40, fast thereon, will cause the latter to turn in their seats 38 and will thus force the shaft 37 to swing downwardly and inwardly through the curved portion 47 of the seat slots, it being understood that the clamp nuts 55 on the top guide pins 25 and 41 on the shaft have been loosened to permit the shaft and seed board to have free play for adjustment. When the shaft 37 has been turned until the desired position is indicated on the dial 56, the nuts 41 and 55 are tightened, and the seed board will have been adjusted toward its dotted position, shown in Fig. 1, such adjustment serving to decrease the clearance between the seed comb 30 and the saws to retard the escape of the seed, and to contract the size of the roll box causing the seed roll to force the feed control concave 20 outwardly towards its dotted position and thereby reducing the rate of feed. Thus, both the volumetric flow of seed through the roll box will be reduced and their escape being retarded, the time of treatment is increased and there will be closer delinting.

In the final adjustment, the shaft 37 is shifted to the inner bottom end of the control slots 47, which is the position shown in Fig. 8, and thereupon the seed board will have shifted it to the dotted position shown in Fig. 1, reducing the seed escape clearance between its comb and the saw to a minimum, greatly reducing the rate of flow and extending the time and extent of delinting treatment.

The worm gear drive acts always to lock the shaft 37 in any set position to which it has been adjusted in its guide slots.

In the case of a battery of linter gins, the advantage of the indicator dials will be immediately apparent as the operator can set the seed board in the prescribed adjustment in each gin quickly and accurately, and can detect and check any changes in this adjustment with the greatest ease. Heretofore, each adjustment of a seed board has had to be made more or less by guess work, but my dial control of the seed board permits of both quick and exact adjustments.

When, as is often the case, it is required to remove a seed board entirely from the breast, it is important to note that this can be accomplished with the use of my invention without loss of the adjustment setting of such seed board, and is accomplished as follows:—The top jam nuts 55 are released, the nuts 41 at each end of the shaft 47 are run outwardly until washers 40 are disengaged from their seats but not disengaged from their keys 39. When this occurs there is nothing to hold the shaft 37 from free movement in its guide slots 46, 47 and therefore the seed board can be lifted out of the breast, the shaft 37 passing outwardly through its slot openings 46 while the upper seed board guide pins 45 run up and out of their guide slots 26. When the seed board is replaced, the washers, having remained engaged with their respective aligned keys 39, will have retained their corresponding position and when they are again engaged in their seats 38 they restore the shaft to its angular position and the seed board to its adjustment, the adjusted position of the shaft 37 relative to the seed board being held unchanged by the lock of its worm gear adjustment. Thus, whenever a seed board is replaced, it will be replaced in exactly the same adjustment that it had before it was dismounted from the gin breast, and therefore no readjustment is required by reason of such removal.

The pressure of the seed roll in the roll box and its direction of rotation both serve to facilitate and make easy the adjustment of the seed board. Thus, the pressure from the seed roll tends to displace the seed board radially outwardly from the center of the roll box and thus assists in its outward or opening movement. The downward thrust of the rotating roll tends, by engagement with the seed board, to force it downwardly and thus assists its inward or closing adjustment. These two forces are so nearly in balance that the seed board will be found to be very free and easy in its manual adjustments. When the seed board has been adjusted to its working position, the nuts 41 and 55 can be run in and will clamp the shaft 37 and pins 25 securely in set position.

When it is desired to effect an arcuate adjustment of the comb 29 relative to the seed board, this may be done either by the use of the shims 65, as already pointed out, which, as shown in Fig. 7, will bring about a rough adjustment in a horizontal plane between the comb and the seed board so that the comb will for any given adjustment of the shaft 37 have a somewhat closer setting to the saw.

It is at times desirable to obtain an additional and arcuate rough adjustment of the comb relative to the seed board as it may be desired to make a heavier or lighter cut of the lint and this may be accomplished, as shown in Fig. 7, by providing each comb bracket 66 with a pair of holes and securing each bracket through one or the other of these holes by means of a pin 67 to its respective mounting bracket 62, the plate 28 sliding under the seed board facing plate 27 to permit of these adjustments. Both the shim and pin adjustments are rough adjustments and are accomplished independently of the indicated setting of the shaft 37. Thus the comb, according to the seed stock to be delinted and the extent desired of the delinting, may be preliminarily set to the desired rough adjustment relative to both seed board and saws, and then the refined adjustments can be accomplished by means described for the manipulation of the eccentric shaft 37.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:—

1. A gin breast having elements which constitute a roll box comprising an adjustable seed board, means to adjustably mount the lower portion of said board in the breast, and means to guide the upper portion of said board and adjust it bodily through an arcuate path of travel to expand and contract the roll box responsive to its mounting adjustments.

2. A gin breast having elements which constitute a roll box comprising an adjustable seed board, rotatable and bodily shiftable means to adjustably mount the lower portion of said board in the breast, and means to guide the upper portion of said board for both vertical and lateral adjustment through an arcuate path of travel to expand and contract the roll box responsive to its mounting adjustments.

3. A gin breast having elements which constitute a roll box comprising an adjustable seed board, eccentric bearing means to adjustably mount the lower portion of said board in the breast, and means to guide the upper portion of said board and adjust it bodily to expand and contract the roll box responsive to its mounting adjustments.

4. A gin breast according to claim 1, in which the lower mounting for the seed board comprises a pivotal support and means to mount the said pivotal support for arcuate adjustment bodily in the breast.

5. A gin breast according to claim 1, in which the lower mounting for the seed board comprises a shaft journalled on the seed board, and eccentric means adapted to adjust said shaft angularly and arcuately in the breast.

6. A gin breast according to claim 1, in which the means for adjustably mounting the lower end of the seed board in the breast comprises a shaft on which the seed board is pivoted, and the breast comprises guides for said shaft, and eccentric elements coacting with the breast and shaft to mount said shaft for angular and bodily adjustments in the breast.

7. A gin breast having elements which constitute a roll box comprising an adjustable seed board, upper and lower sets of guides for said board, one set comprising a mounting shaft for the board, eccentrics on said shaft, and means acting through said shaft and eccentrics to shift the seed board bodily in its guides.

8. The combination with a gin breast comprising an adjustable seed board defining part of its roll box, of a pivotal support for the lower end of said seed board movably mounted in the breast, breast guides in which the upper end of said seed board is adjustable both upwardly and outwardly in an arcuate path, operating means to move said pivotal support, and means to secure said board to the breast in its adjusted working position.

9. The combination with a gin breast comprising an adjustable seed board defining part of its roll box, of a pivotal support for the lower end of said seed board movably mounted in the breast, breast guides for the upper end of said seed board, a common operating means for shifting said seed board throughout its range of adjustment by movement imparted to its said pivotal support, indicator means controlled by said common operating means to show the adjustment of the seed board, and means to secure said board to the breast in its adjusted working position.

10. The combination with the breast of a linter gin comprising an adjustable and demountable seed board, of means to guide the adjustment of the board throughout its range of working positions, and means to actuate the seed board throughout said adjustments comprising a shaft on the seed board bearing eccentrics, fixed seats in the breast for said eccentrics, means to disengage said eccentrics from said seats to free the shaft and seed board for disengagement from the breast, clamp means to secure the seed board in adjusted position in the breast, and means to rotate said shaft and eccentrics.

11. In a gin breast, a roll box having an adjustable seed board, a shaft having guides in the breast in which it is movable for adjustment, eccentric bearings axially adjustable on said shaft, seats on the breast into and out of which said eccentrics are movable, bearings for said shaft on the lower part of said seed board, a worm drive on the seed board for rotating said shaft, and means to make the shaft fast in any adjusted position in the breast.

12. A linter gin breast according to claim 10, in combination with an adjustment indicator means, responsive to the rotation of said shaft, to show the angular position of the eccentrics in said seats.

13. A linter gin breast according to claim 10, in combination with an adjustment indicator means, controlled by the rotation of said shaft and externally visible to show the angular position of the eccentrics in said seats.

14. In a linter gin breast having elements which define a roll box and comprise a seed board, means to adjustably mount said board in the breast to vary the size of said roll box and control the delinting action, comprising upper and lower sets of coacting mounting and guide elements on the breast and seed board, the lower set of elements comprising a shaft journalled on the seed board and having eccentrics rotatable therewith, and the breast having fixed seats shaped to receive said eccentrics and being slotted to permit the shaft to follow the arcuate motion imparted to it by the rotation of its eccentrics in said seats, and means to adjust the seed board by rotating said shaft.

15. A breast mechanism for linter gins according to claim 7, in which the eccentrics are disengageable from their respective seats to free the shaft for removal with the seed board from the breast, in combination with means to maintain the corresponding angular setting of the eccentrics on the shaft while disengaged from their seats.

16. A breast mechanism for linter gins according to claim 7, in which the eccentrics are axially adjustably mounted by means of aligned keys on said shaft which permit their disengagement from their respective seats, stops to prevent their disengagement from said keys, and the seed board guide elements are adapted to permit the removal of the assembled seed board and shaft controlled adjusting means from the breast.

17. The combination with a linter gin breast comprising an adjustable seed board defining part of its roll box, of means to adjust said board both vertically and laterally, a single manually controlled actuator for producing all of said adjustments of said board, and a dial indicator means associated with said adjustment control to permit the ready setting of said seed board in any predetermined selected adjustment.

18. A gin breast having elements which form a roll board comprising a seed box, means to mount said board for both vertical and lateral adjustments through an arcuate path, and a common actuator to effect all adjustments of said seed board.

19. A gin breast having elements which form a roll board comprising a seed box, means to mount said board for both vertical and lateral adjustments through an arcuate path, and a common actuator operating through a worm gear transmission to effect all adjustments of said seed board.

GEORGE C. MORGAN.